(12) United States Patent
Achacoso et al.

(10) Patent No.: US 8,015,495 B2
(45) Date of Patent: Sep. 6, 2011

(54) CENTRIFUGAL COMMUNICATION AND COLLABORATION METHOD

(75) Inventors: Theodore B. Achacoso, Washington, DC (US); D. Wayne Silby, Washington, DC (US)

(73) Assignee: Groupserve IT Trust LLC, Beltsville, MD (US)

( * ) Notice: Subject to any disclaimer, the term of this patent is extended or adjusted under 35 U.S.C. 154(b) by 2074 days.

(21) Appl. No.: 10/375,358

(22) Filed: Feb. 28, 2003

(65) Prior Publication Data

US 2003/0149806 A1 Aug. 7, 2003

Related U.S. Application Data

(63) Continuation of application No. 09/709,441, filed on Nov. 13, 2000, now Pat. No. 6,772,229, which is a continuation-in-part of application No. 09/041,599, filed on Mar. 13, 1998, now Pat. No. 6,161,149.

(51) Int. Cl.
*G06F 3/00* (2006.01)

(52) U.S. Cl. ........ 715/751; 715/752; 715/753; 715/759; 715/744; 715/749; 710/4; 709/203

(58) Field of Classification Search .................. 715/744, 715/749, 750–761; 709/203; 710/4
See application file for complete search history.

(56) References Cited

U.S. PATENT DOCUMENTS

| | | | |
|---|---|---|---|
| 5,144,557 A | 9/1992 | Wang et al. | |
| 5,293,250 A | 3/1994 | Okumura et al. | |
| 5,418,908 A | 5/1995 | Keller et al. | |
| 5,548,753 A | 8/1996 | Linstead et al. | |
| 5,617,539 A | 4/1997 | Ludwig | |
| 5,632,018 A | 5/1997 | Otorii | 709/200 |
| 5,675,507 A | 10/1997 | Bobo, II | 709/206 |
| 5,689,641 A | 11/1997 | Ludwig | |
| 5,694,544 A * | 12/1997 | Tanigawa et al. | 715/753 |
| 5,694,546 A | 12/1997 | Reisman | 705/26 |
| 5,751,338 A | 5/1998 | Ludwig | |
| 5,790,790 A * | 8/1998 | Smith et al. | 709/206 |
| 5,790,793 A | 8/1998 | Higley | 709/218 |
| 5,796,393 A | 8/1998 | McNaughton et al. | 345/329 |
| 5,813,007 A | 9/1998 | Nielsen | 707/10 |
| 5,819,269 A | 10/1998 | Uomini | |

(Continued)

FOREIGN PATENT DOCUMENTS

EP 0 561 649 9/1993

(Continued)

OTHER PUBLICATIONS

Robert W. Hall, et al., Corona: A Communication Service for Scalable, Reliable Group Collaboration Systems., 1996 ACM, pp. 140-149.*

(Continued)

*Primary Examiner* — Tadeese Hailu
(74) *Attorney, Agent, or Firm* — Nixon & Vanderhye PC

(57) ABSTRACT

A method of facilitating communications and collaboration of a group of plural remote participants comprises steps of receiving information over an information communications network from a first group participant; pushing, over the network to at least one other group participant, an access via an access channel; and allowing the other group participant to access at least some of the received information via said access channel in response to selective activation of the access channel by the other group participant.

25 Claims, 4 Drawing Sheets

U.S. PATENT DOCUMENTS

| | | | |
|---|---|---|---|
| 5,842,216 A | 11/1998 | Anderson et al. | 707/203 |
| 5,854,893 A | 12/1998 | Ludwig | |
| 5,867,654 A | 2/1999 | Ludwig | |
| 5,884,039 A | 3/1999 | Ludwig | |
| 5,892,909 A | 4/1999 | Grasso et al. | 709/201 |
| 5,893,114 A | 4/1999 | Hashimoto et al. | 707/200 |
| 5,915,091 A | 6/1999 | Ludwig | |
| 5,930,471 A | 7/1999 | Milewski | 709/204 |
| 5,960,406 A | 9/1999 | Rasansky et al. | |
| 5,978,835 A | 11/1999 | Ludwig | |
| 6,065,058 A * | 5/2000 | Hailpern et al. | 709/231 |
| 6,081,291 A | 6/2000 | Ludwig | |
| 6,119,167 A * | 9/2000 | Boyle et al. | 709/234 |
| 6,167,426 A | 12/2000 | Payne et al. | |
| 6,195,694 B1 * | 2/2001 | Chen et al. | 709/220 |
| 6,212,547 B1 | 4/2001 | Ludwig | |
| 6,212,549 B1 * | 4/2001 | Page et al. | 709/205 |
| 6,223,177 B1 | 4/2001 | Tatham et al. | |
| 6,230,185 B1 * | 5/2001 | Salas et al. | 709/205 |
| 6,233,600 B1 | 5/2001 | Salas et al. | |
| 6,237,025 B1 | 5/2001 | Ludwig | |
| 6,289,333 B1 * | 9/2001 | Jawahar et al. | 707/2 |
| 6,310,941 B1 * | 10/2001 | Crutcher et al. | 379/88.17 |
| 6,343,313 B1 | 1/2002 | Salesky et al. | |
| 6,343,314 B1 | 1/2002 | Ludwig | |
| 6,351,762 B1 | 2/2002 | Ludwig | |
| 6,426,769 B1 | 7/2002 | Ludwig | |
| 6,437,818 B1 | 8/2002 | Ludwig | |
| 6,513,069 B1 * | 1/2003 | Abato et al. | 709/238 |
| 6,560,707 B2 * | 5/2003 | Curtis et al. | 713/163 |
| 6,583,806 B2 | 6/2003 | Ludwig | |
| 6,608,636 B1 * | 8/2003 | Roseman | 715/753 |
| 6,728,756 B1 * | 4/2004 | Ohkado | 709/205 |
| 6,728,784 B1 * | 4/2004 | Mattaway | 709/245 |
| 6,807,558 B1 * | 10/2004 | Hassett et al. | 709/203 |
| 6,816,904 B1 | 11/2004 | Ludwig | |
| 6,857,102 B1 | 2/2005 | Bickmore et al. | |
| 6,898,620 B1 | 5/2005 | Ludwig | |
| 6,965,864 B1 | 11/2005 | Thrift et al. | |
| 6,981,256 B2 * | 12/2005 | Jawahar et al. | 718/101 |
| 2002/0073206 A1 * | 6/2002 | Jawahar et al. | 709/227 |
| 2002/0194272 A1 * | 12/2002 | Zhu | 709/204 |

FOREIGN PATENT DOCUMENTS

| | | |
|---|---|---|
| EP | 0 736 989 | 4/1996 |
| EP | 0 739 115 | 10/1996 |
| EP | 0 785 661 | 1/1997 |
| EP | 0 798 899 | 10/1997 |
| GB | 2 272 349 | 5/1994 |
| JP | 04138741 | 5/1992 |
| JP | 06069952 | 3/1994 |
| JP | 07210476 | 8/1995 |
| JP | 08237297 | 9/1996 |
| WO | WO 98/00787 | 1/1998 |

OTHER PUBLICATIONS

Jason Wood et al,. Collaborative Visualization, 1997 IEEE, pp. 253-259.*

J. Chris Lauwers and Keith A. Lantz, Collaboration Awareness in Support of Collaboration Transparency: Requiremnets for the Next Generation of Shared Window Systems, 1990 ACM, pp. 303-311.*

Siviter, D., Petre, M., and Klein, B., "Harnessing Technology for Effective Inter- and Intra-institutional Collaboration: Report of the ITiCSE'97 Working Group on Supporting, Inter- and Intra-institutional Collaboration," Working Group Reports and Supplemental Proceedings, Aug. 1997, pp. 70-93.

"Groupware—Communication, Collaboration, Coordination," Groupware, 1997, pp. 1-41.

"Add an Alert." from http://web.archive.org/web/20030117161532/http://greenspun.com/bboard/add-alert.tcl?topic=3D_Floyd, 2003.

Allaire Forums 2.0 Offers Dynamic New Features . . . Web Conferencing and Threaded Discussions. from http://web.archive.org/web/19970618234847/www.allaire.com/, 1997.

"Basic Support for Cooperative Work on the World Wide Web." from http://bscw.gmd.de/Papers/IJHCS/IJHCS.html. 1997.

"Ceilidh's Lilikoi Forum." from www.lilikoi.com/features.html. 1997.

"Community Internet Services: Group Services: Service Options." from http://web.archive.org/web/19961101031233/cois.com/group/grp_opts.html. 1996.

"Communityware upgraded with new interface and additional features." from www.durand.com/press/pr_cwfeatures.htm. 1997.

Wooley, "Conferencing on the Web." from http://www.thinkofit.com/webconf/wcunleash.htm. 1995.

"3D_Floyd." from http://web.archive.org/web/19971221092805/greenspun.com/bboard/q-and-a.tcl?topic=3D_Floyd. 1997.

"Delphi's Custom Forum." from http://www.customforum.com/features.html Date: 1998.

"GroupMaster: The easy email list manager." from www.meridian-marketing.com/REVNET/gmdetailmain.html. Date: before 2003.

"Infopop: About the Company." from www.infopop.com/aboutus/. 2002.

"Instructions for Using Hypernews 1.9." from www.dranonymous.com/hn/instructions.html. 1996.

"MHonArc v2.5: Introduction." from www.mhonarc.org/MHonArc/doc/intro.html. 2001.

"MHonArc v2.5: Quick Start." from www.mhonarc.org/MHonArc/doc/quickstart.html. 2001.

"net.Thread 96: Product Information." from http://web.archive.org/web/19961222210244/www.eshare.com/eshare/net_thread/cell3.html. 1996.

"Nicenet's Internet Classroom Assistant." from http://web.archive.org/web/19990125072247/129.105.114.23/. 1998.

"Proxicom J/Forum." from http://web.archive.org/web/19971212053118/www.proxicom.com/products/jforum/. 1997.

"SamePage Datasheet." from http:///web.archive.org/web/19980424091751/http://www.accentuate.com/samepage/products/DSap.html. 1998.

"Sixdegrees—my bulletin board." from http://webmail.archive.org/web/19980416103158/sixdegrees.com/About/mybulletinboard.cfm?PF=166181270631. 1998.

"Spectrum: Interactive Media & Online Developer News." from www.3dlinks.com/spectrum/issues/spectrum-oct-06-97.cfm. Date: 1997.

"Supporting Collaborative Information Sharing with the World Wide Web: The BSCW Shared Workspace System", from http://bscw.gmd.de/Papaers/WWW4-Boston/WWW4-Boston.html. 1995.

"Tech Directs Strategist: Mailing List Tools." from www.techdirect.com/strategy/mltech.html. 1997.

Accentuate Systems, I. "Product: TakeAction!" from http://www.accentuate.com/takeaction.html. Date: 2001.

CREW. "Announcing CREW." Retrieved from file:///A|/CREWINTER.HTM. Date: 1996.

Fritsch, M. "Platforms for Virtual Seminars." ZIFF. Nov. 1997.

Hunt, R. A. Affordances and Constraints of Electronic Discussions. 13th Inkshed Working Conf. Date: May 1996.

Hypernews. "Application of a Hypernews Mail Gateway." from http://www.hypernews.org/Hypernews/get/hypernews/email/14/1.html. Date: 1996.

Hypernews. "Collaboration with Hypernews." from http://web.archive.org/web/19970104181300..uc.edu/~liberte/hypernews/overview.html. Date: 1995.

Hypernews. "Email Notification of postings without content?" from www.hypernews.org/HyperNews/get/hypernews/subscribing/25.html. Date: 1997.

Hypernews. "HyperNews: Instructions: Email Subscribing and Unsubscribing." from http://www.hypernews.org/HyperNews/get/hypernews/subscribing.html. 1996.

Hypernews. "Hypernews: Source: Installation: Email Gateway." from www.hypernews.org/HyperNews/get/hypernews/email.html. 1995.

Hypernews. "Other Ways to Subscribe and Depth Ideas." from http://www.hypernews.org/HyperNews/get/hypernews/email/10/3/html. 1996.

Hypernews "Some member and Subscription details." www.hypernews.org/HyperNews/get/hypernews/about/56/1.html pp. 1998.

Hypernews. "Source: History of Hypernews." from www.hypernews.org/HyperNews/get/hypernews/history.html. 2002.

Hypernews "Unsubscribe or don't subscribe." http://www.hypernews.org/HyperNews/get/hypernews/subscribing/54/1.html pp. 1. Date: 1999.

Hypernews. "Subscribe to be notified by email." from http://www.hypernews.org/HyperNews/get/hypernews/subscribing/4/1.html. Date: 1996.

Hypernews "Subscribe or unsubscribe." www.hypernews.org/HyperNews/edit-subscribe.pl/hypernews/test.html, Date: 2002.

Hypernews. "What is Hypernews: A Brief Overview." from http:///web.archive.org/web/19970104111427/http://union.ncsa.uiuc.edu/HyperNews/get/Hypernews/about.html. Date: 1996.

Lotus Institute. "Lotus TeamRooms." from www2.lotus.com/institute.ns . . . dc616852564bf0068552b?OpenDocument. Date: 1997.

Lotus Institute. "Supporting Teams with Collaborative Technology." from www2.lotus.com/Institute.ns. Date: 1997.

Lyris. "Email List Servers." from http://web.archive.org/web/19980109173254/lyris.com/features/mail/index.html. Date: 1998.

Microsoft. "Microsoft BackOfffice Building Exchange and Outlook Solutions." from www.microsoft.com/exchange/...yment/collabsolution, Date: 1997.

"The New Way to Share WorkGroup Information." from file:///A|/NETSCA~2.HTM. Date: 2000.

PointCast. "The Most Exciting Way to Get Your News." from www.pointcast.com/whatis_fromhome.html. Date: 1997.

Wayfarer. "Wayfarer INCISA System." from www.wayfarer.com/products/default.htm. Date: 1997.

"GroupMaster free download. A web-based email list management system." www.freedownloadcenter.com/Network_and_Internet/Mail_Server_Tools/GroupMaster.html pp. 1-2. Date: 1997.

M.C. Bowman et al. "The Harvest information discovery and access system," Computer Networks and ISDN Systems, vol. 28, iss 1-2, pp. 119-125, 1995.

BSCW. Re: BSCW 3.1.1 Event Notification. [Online]. Available: http://www.gmd.de/endofservice/Mail/bscw-users/0458.html, 1997.

L. Garrett et al. "Intermedia: Issues, Strategies, and Tactics in the design of a Hypermedia Document System," in Proc. of Conf on CSCW, Dec. 3-5, 1986.

B.J. Haan et al. "IRIS hypermedia services," Commun. ACM, vol. 35, iss. 1, pp. 36-51, 1992.

P. Johnson-Lenz and T. Johnson-Lenz, "MIST: Microcomputer Information Support Tools: The Networker's Electronic Toolchest," New Era Technologies, 1983.

P. Johnson-Lenz and T. Johnson-Lenz, "Johnson-Lenz Groupware binder," Groupware Systems, Dec. 1985.

P. Johnson-Lenz and T. Johnson-Lenz, "HCX Desin and Development Resources vol. I," Groupware Systems Feb. 1986.

P. Johnson-Lenz and T. Johnson-Lenz, "HCX Design and Development Resources vol. II," Groupware Systems, Feb. 1986.

E. Moeller et al. "The BERKOM multimedia-mail teleservice," Proc. of the Fourth Workshop on Future Trends of Distributed Computing Systems, pp. 23-30, 1993.

D. Ramduny et al. "Getting to Know: the design space for notification servers," in Proc. CSCW 1998, 1998.

D. Ramduny et al. "Impedance Matching: When you need to know What," in Proceedings of HCI 2002, 2002, pp. 121-137.

D. Ramduny et al. "Why, What, Where, When: Architectures for Coop. Work on the World Wide Web," in Proc. of HCI on People and Computers XII, London, UK, 1997. pp. 283-301.

F. Shipman et al. "Distributed Hypertext for collaborative research: The virtual notebook system," Hyptertext '89 Proceedings, 1989.

C. Tyler, "Notes Doclinks in Sametime," Available: http://www.instant-tech.com/blogs/ctyler.nsf/d6pllnks/CTYR-6BEPN6, 2005.

C. Wehrli, "Opening the lines of communication: Doclinks: Company Operations," Available: www.findarticles.com/p/articles/mi_m0DUD/is_7_21/ai_63255862/print, 2000.

D. Woolley, "Conferencing on the Web," Available: http://www.thinkofit.com/webconf/wcunleash.htm, 1995.

D. Woolley, "The Future of Web Conferencing," Avallable: http://thinkofit.com/webconf/wcfuture.htm, 1998.

N. Yankelovich et al. "Connections in Context: The Intermediate System," in Proc. 21st Hawaii Conf on Software Track, Hawaii, 1988, pp. 715-724.

Office Action in commonly-assigned co-pending related U.S. Appl. No. 10/887,326 (Aug. 20, 2009).

Office Action in commonly-assigned co-pending related U.S. Appl. No. 10/887,326 (May 24, 2010).

* cited by examiner

CENTRIFUGAL COMMUNICATION AND COLLABORATION METHOD

CROSS-REFERENCE TO RELATED APPLICATIONS

This application is a continuation of U.S. patent application Ser. No. 09/709,441, filed Nov. 13, 2000, which is a continuation-in-part of U.S. patent application Ser. No. 09/041,599, now U.S. Pat. No. 6,161,149, filed Mar. 13, 1998, both commonly assigned and incorporated herein by reference.

BACKGROUND OF THE INVENTION

This invention relates to communication and collaboration tools which allow groups to share information across time and space using computer and other communication channels. The inventive method may be incorporated into the design of products such as groupware software and communications services.

The conventional approach to the design of communication and collaboration products, especially of groupware, is a centripetal method, i.e., group members are required to go to a central area in order to retrieve and exchange data and information. For example, in the Internet, group members need to converge on a server in order to communicate and collaborate.

The previous approaches taken in this field can be categorized in two different product groups:

Centripetal method: This method is seen in all of the following products: IBM's Lotus Notes and Domino; Microsoft's Exchange and NetMeeting; Netscape's Virtual Office by Concentric; Radnet's Webshare; Novell's GroupWise; Thuridion's Crew; IntraACTIVE's In Tandem; Linkstar's HotOffice; Changepoint's Involv; Internet Media Inc.'s 3-2-1 Intranet; and others. All of these products require group members to remember to go to a central area (a server) in order to retrieve and exchange data and information. This centripetal design leads producers to develop products by increasing the speed of connection and facilitating access to the central site of communication and collaboration. Using the client-server infrastructure, products are either proprietary servers, enhanced software clients, or both.

Narrowcasting method: This method is seen in all of the following products: PointCast's Client and Server; Marimba's Castanet; Progressive Network's Real Clients and Servers; Microsoft's NetShow; Netscape's Browser and Media Server; Wayfarer's INCISA; and all listserve products. All of these products use the narrowcasting model of one-to-many communication. Group members (many) have to remember to "tune-in" or attend the narrowcasted content served by a central site (one), without knowing whether or not new or relevant information is there.

Both the centripetal and narrowcasting approaches suffer from the disadvantage that group members have to report and remember to report to a central area for communication and collaboration. While they have not failed as models, they have failed to anticipate problems associated with the information age such as information glut and competition for attention. Prior art methods assume that value is added by improving the way group members go about retrieving information that updates at a central location. Collaborative value is stored in the central repository. Group members still must actively go to the central resource to get any information or value from the group. For example, in the Internet, a group member would need to remember to log into a server for a videoconferencing appointment at a designated time. It would be an improvement to such a system for appointments and reminders for appointments to be "pushed" to the group member's awareness via e-mail with a Web hyperlink to the videoconference, via a narrowcast of the appointment, or other technologies that drive the information outward to the group member.

In the digital era, the computer has increasingly become a substitute for physical presence and interaction. Designers, however, have focused on providing cheaper and quicker access and offering additional functionality such as manipulation of the data and information sought. In the attempt to mimic human interaction such as congregating in a town hall for a meeting (a centripetal method) via electronic means, the power of the electronic medium to conduct the meeting outside of the town hall has been ignored.

SUMMARY OF THE INVENTION

The invention, referred to in some of its aspects as a Centrifugal Communication and Collaboration Method (CCCM), reverses the established centralized design of communication and collaboration products especially of groupware software. CCCM "pushes" out to group members the data and information contained in a central area. This centrifugal flow is distinct from the current centripetal design of such products, and provides numerous advantages.

A centrifugal arrangement improves the ability of groups to communicate, collaborate, and exchange information because of its focus on the individual group members rather than a central meeting site. CCCM creates value in interactive group-oriented software applications by distributing the accumulated group knowledge and activity to the individual group members, rather than forcing the group members to go to the central source of data and information where the wealth of the group is stored. Previous applications focused on better, cheaper, and faster ways to bring group members together in a central location. CCCM focuses on using the interactive capabilities of networks to maintain value among the group members, not only at a central repository of information and data.

The active, centrifugal delivery to users of updated information relevant to the members, such as the actions of other group members, the status of their pending group activities, the status of their requested information, etc., simplifies the process by which group members use software programs to gain information over networks. Since the information is pushed, there is minimal need to converge at a central repository.

The prior art model is a centripetal model. Individual users are attracted to or pulled into that central place. The value added by previous software programs has been to make the access easier and cheaper and to improve the manipulation of data.

With CCCM, the dynamic is a centrifugal push, the opposite of the prior art model. The flow of information among members of a group using CCCM-enabled communication and collaboration software is outward in direction. CCCM takes the value of the central resource out to the individual users. The members must converge at the centrifugal core only briefly. They are notified when they must do so, and their convergence is facilitated by shortcuts that make it easier to converge. Collaborative activity is moved away from the central core out through the network to the user's peripheral location. For example, in the Internet, group members automatically receive from a server the data necessary to communicate and collaborate as a group.

CCCM is an integrative method. Using a computer network, it employs software code and servers to distribute content. In an internetworked environment, if group collaboration software resides together with an HTTP server, then pushing out the group-generated information by e-mail employs a mail server, a network connection of all group members, and software code within the group collaboration software that calls on the mail server to push content. Or, if the group-generated information is distributed by narrowcasting, then a narrowcasting server may be used from which narrowcasting clients of group members receive information feed. The group collaboration software, through added software code, then communicates with the narrowcasting server to deliver group-generated information to group members.

As distinguished from other group-oriented software, CCCM reverses the basic assumption about how group value is created and information is shared. Rather than focusing on bringing group members into a central location in a better, cheaper, and faster way, CCCM empowers the users by providing them information right where they are and leaves them to decide whether or not to go to the central site at all.

As distinguished from other uses of "push" technology, the content in CCCM is provided and continuously changed by the group members. The traditional push system is broadcasting, such as television and radio. In this traditional model, preset content is sent to all viewers who have means to receive it, such as TV or radio. Viewers must be there at the same time as the broadcast to receive the content they want, or they must record it at the time of broadcast.

The general Internet model of push is narrowcasting. As with broadcasting, the source(s) of content are decided by the narrowcaster, and filtered according to the users' predetermined criteria as to what will be received.

By contrast, the content of CCCM that is continually being "pushed out" is not a standard collection of information selected by a central narrowcaster, but is a custom mix of information that remains in flux. The information that is pushed is created and continuously modified by the group members themselves. Messages and other information are unique to and generated by group members, and are determined by the role of that member in the group.

Rather than substitute an electronic model for the physical model of a meeting place, CCCM enhances the model of group interaction by taking advantage of the possibilities of virtual and digital communication and collaboration. While all other models took the previous "real world" example of a meeting hall, substituted it in cyberspace, then improved upon the substitute, CCCM uses the power of electronic methods to provide centrifugal flow that enhances the physical model.

CCCM removes the need for individuals to gather at a central location to find out what is there, what has changed since they were last there, and what they can do there. All group value no longer resides in the central resource. CCCM takes the dynamic group information from the center as it is changing with the contributions of its diverse members and distributes it out to those members.

A system for communicating information among members of a group comprises for each group member, a peripheral device capable of transmitting and receiving information; and a central agent comprising two-way links to the peripheral devices capable of receiving and transmitting information, a notice generator triggered by an information input from an inputting member directed to a receiving member, the notice generator generating a notice for the receiving member, and pushing the notice to the peripheral device of the receiving member only if the member is one to whom the associated information input was directed, a central storage medium in which the information input is stored, and an access channel of the link by which the receiving member may receive the information input only if the receiving member responds to the notice.

The access channel is preferably a hyperlink URL in an e-mail embodiment of the invention.

The notice generator may push the notice immediately or at the end of a predetermined period, when all notices generated during the preceding period are pushed together. The notice preferably comprises a summary of the information input, and a link to the information input on the central database. The notice generator may push notices via e-mail, narrowcasting, or a combination. Access to the central agent preferably requires using a password, and information inputs and notices may be encrypted.

The links may form a computer network, a cable network, a telecommunications network, a wireless network, or a combination. The central agent may reside as a program operating on at least one of a network server, an internet, and an intranet. The inputs are preferably retained in the central storage medium as a database archive for a predetermined period. The system may comprise a network server farm including a server selected from the group consisting of groupware, a video server, an audio server, a chat server, and a news server.

A method for communicating information among members of a group having peripheral devices capable of transmitting and receiving information comprises providing a central device capable of receiving information from the peripheral devices and transmitting information to the peripheral devices, linking the central device to the peripheral devices, when a first information input is transmitted from the peripheral device of a member of the group directed to at least one other member of the group, centrally receiving the first information input, associating the first information input with the at least one other member, preparing a notice of the first information input for the at least one other member, pushing the notice to the peripheral device of the at least one other member, and centrally storing the first input such that when the at least one other member receives the notice, the at least one other member can retrieve the first information input at the respective peripheral device, and can respond by transmitting a second information input, and minimizing the information transmitted to the peripheral devices by pushing a notice to a member only if the member is one to whom the associated information input was directed, and transmitting an information input to a member only if the member responds to a notice.

The first information input is typically directed to a plurality of other members, and the second information input may be directed to the first member, another member, or a plurality of members. The method may further comprise allowing a person to join as a member of the group by forming a link with the person, and inviting a person to join as a member of the group.

In another embodiment, a computer readable medium comprises a program for carrying out the method according to the invention.

Further objectives and advantages will become apparent from a consideration of the description and drawings.

BRIEF DESCRIPTION OF THE DRAWINGS

The invention is better understood by reading the following detailed description with reference to the accompanying figures, in which like reference numerals refer to like elements throughout, and in which:

FIG. 3-A shows the flow of information from the initial input by member P1. FIG. 3-B shows a response by member P2 directed to member P1. FIG. 3-C shows a response and comment by member P3, directed to members P1 and P2.

FIG. 4-A shows the flow of information received at separate times from each of the members P1-P3. FIG. 4-B shows the flow of information periodically pushed to the members.

DETAILED DESCRIPTION OF THE PREFERRED EMBODIMENTS

Figure 1:
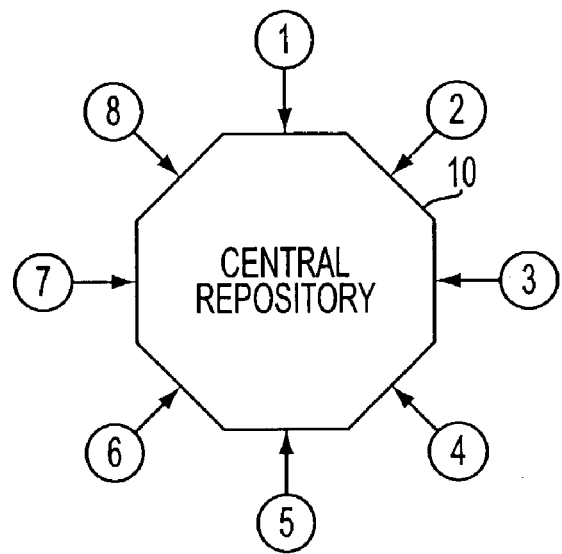
FIG. 1 illustrates a prior art model for centripetal communication and collaboration in a group.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

In the prior art as shown in FIG. 1, an eight member group is depicted as circles 1-8, connected to central repository 10. Each user must converge on the central repository 10 to obtain information. If a member does not converge, the member has no access to information that is contained in central repository 10, and no knowledge of whether the information in repository 10 has been changed or updated, and has no way of knowing if any new information is relevant to that particular member. Convergence must be done on a "blind" basis, and is typically done periodically, such as every day or twice a day whether needed or not. Central repository 10 is essentially a database, presenting all information and making it available in a standardized fashion to each member to access and review. The information may be filtered to the individual members, but it must all be stored centrally for such a system to operate effectively.

Figure 2:
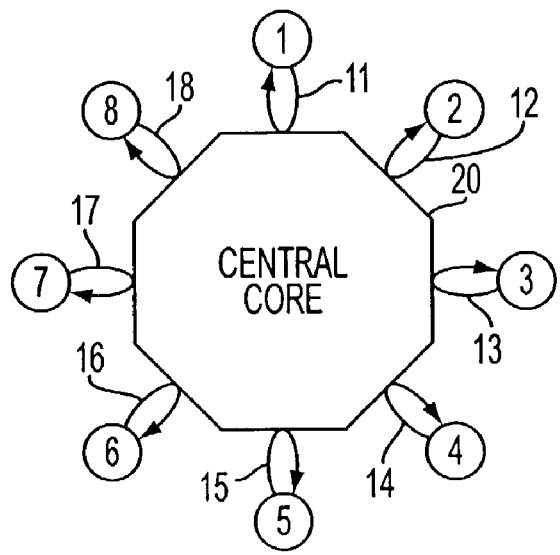
FIG. 2 illustrates the centrifugal communication and collaboration method of the invention.

In a schematic depiction of the invention as shown in FIG. 2, an eight member group is shown oriented around central core 20. Each member has a unique flow of information sent to and received from the central core 20, depicted as individual curved arrows 11-18. Members are notified when relevant information is posted at the central core 20, and may then retrieve the information knowingly. They need not converge blindly on the central core. In addition, because information is tailored and directed to individual members, the arrangement of information at the central core does not need to be a standardized database available to all members.

Preferred embodiments of the invention include the following.

Software intended for use by groups, enabled with CCCM by programmed code intended to push out group-generated information by e-mail, narrowcasting, and other such distribution methods. For example, a group discussion software contains software code that allows discussion content to be e-mailed to the entire set or a subset of participants. An additional program may run at a predefined interval to notify participants of what content is new, what has been read and what has not, or whether or not they have been requested to respond to a particular comment. The individualized e-mail contains the content plus a mouse-clickable Web hyperlink to the message itself from the central server and/or to the entire discussion. The Web hyperlink may in itself open a videoconference, or the Web hyperlink may open a window that contains channelized connections not only to the discussion and videoconference, but also to the schedule and address book of the group member. Another example is a group scheduling software linked to a narrowcasting system that activates a narrowcasting client which then narrowcasts, say, the events of the day or of the month, or that an appointment is about to become due, or that an Internet presentation is about to begin, or that someone has replied to a comment in a group discussion. Both e-mail and narrowcasting can be done in multimedia, such as text, audio, video, and images.

CCCM can be used in non-computer-based networks, provided there is bi-directional exchange of information, including telecommunication systems, newer versions of cable-based networks, wireless networks and others. The invention does not much depend on how the network is linked. What is important is that each database record or field has a URL or similar "retrievable handle" that can be accessed for retrieval by the network, and that this URL or handle can be "pushed" in various ways (like e-mail) so that following (or clicking on) the link will retrieve the database record or field.

The variations occur in the technology used to distribute centrifugally group-generated information. Distribution may occur by e-mail, by narrowcasting, and by other electronic means. According to the invention, there is a method to distribute group-generated information to group members, without requiring them to converge at a central area, and the method is selective and deliberate as to what information is being delivered. Users need not remember to go to a central site for collaboration. CCCM makes participation among users more convenient and improves communication and collaboration products which are currently in existence and which may be developed in the future.

According to the invention, groups may be self-initiated. In other words, in an internet embodiment, one person can identify e-mail addresses for a desired group of colleagues, friends, or family, name the group, and provide a uniform resource locator (URL) for a group conference. The system pushes an e-mail notice to the desired group, with the URL. The recipients, by clicking on the URL, are brought to a conference area. In synchronous mode, they can communicate in streaming conversation, and can scroll through messages. In asynchronous mode the members may participate and return at any time. If a member has not returned for a predetermined time, a notice may be pushed to the member (a) reminding them that a response is desired, (b) indicating that a new message is there, or (c) providing a summary of recent activity.

Figure 3A:
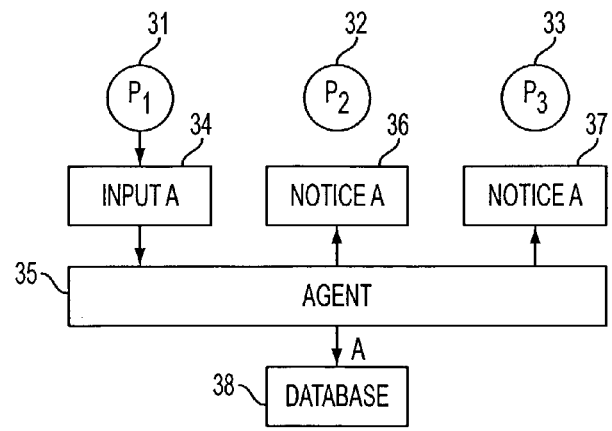
FIGS. 3-A to 3-C show flow charts for the asynchronous events in a responsive, rapid interaction among three individual members of a group.
Figure 3B:
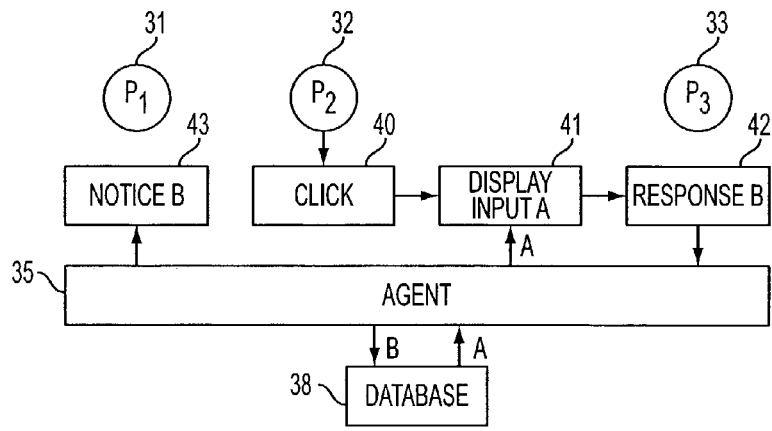
Figure 3C:
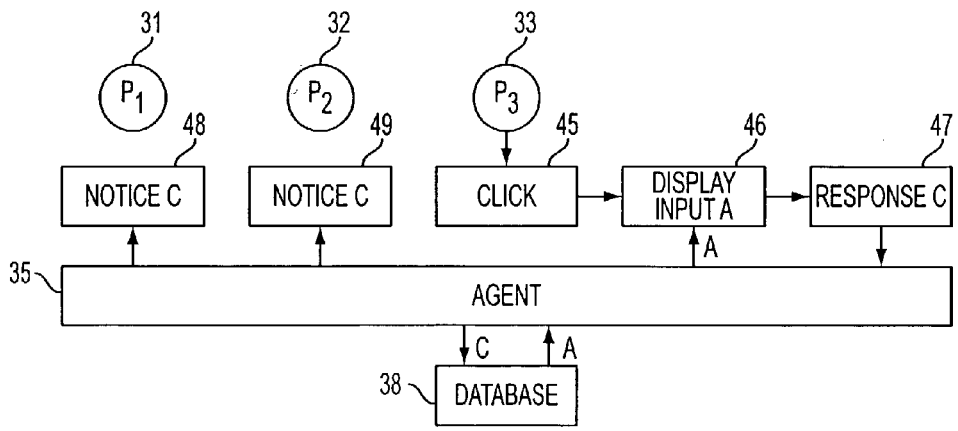

An e-mail driven embodiment is shown in FIGS. 3-A to 3-C. These flow charts represent a responsive continuous interaction among three individual members of a group. Although the events are asynchronous, they may be % relatively rapid. Throughout, the agent identifies and pushes the appropriate URLs to the appropriate people. In FIG. 3-A, member Person 1, identified as circle 31, initiates a session by providing an initial input A in a peripheral device such as a personal computer, as identified by box 34. In this example, input A is a question for members Person 2, identified as 32, and Person 3, identified as 33. The question could be "What is the status of Project X?" Intelligent agent 35 receives input A from member Person 1, selects the members to whom the input is relevant, in this case Person 2 and Person 3, and pushes and posts notice of activity with hyperlink at the peripheral computers 36 and 37 for members Person 2 and Person 3. In addition, the intelligent agent 35 stores input A on the central database 38 as database record A.

In FIG. 3-B, member. Person 2 (box 32) receives notice A 36 as in the previous figure, and responds by clicking the hyperlink, box 40. This brings input A directly to member Person 2 from the central database, and displays the question "What is the status of Project X?" as shown in box 41. Member Person 2 provides a status report to Person 1, which may include text, graphics, video, and audio, and inputs the report as input Response B, shown as box 42. Agent 35 selects Person 1 as the relevant member, pushes and posts notice B with hyperlink shown as box 43 on the peripheral device of Person 1, and stores input B as database record B in central database 38.

In FIG. 3-C member Person 3 provides a response and comment directed to both of the other members. Person 3 responds to notice A by clicking the hyperlink, box 45. This brings input A directly to Person 3 from the central database, and displays the question "What is the status of Project X?" as shown in box 46. Member Person 3 provides a different status report, input C, directed to both members Person 1 and Person 2, shown as box 47. Agent 35 selects members Person 1 and Person 2 as the relevant members, pushes and posts notice C with hyperlink shown as box 48 and 49 on the peripheral device of Person 1 and Person 2, and stores input C as a database record in central database 38.

Figure 4A:
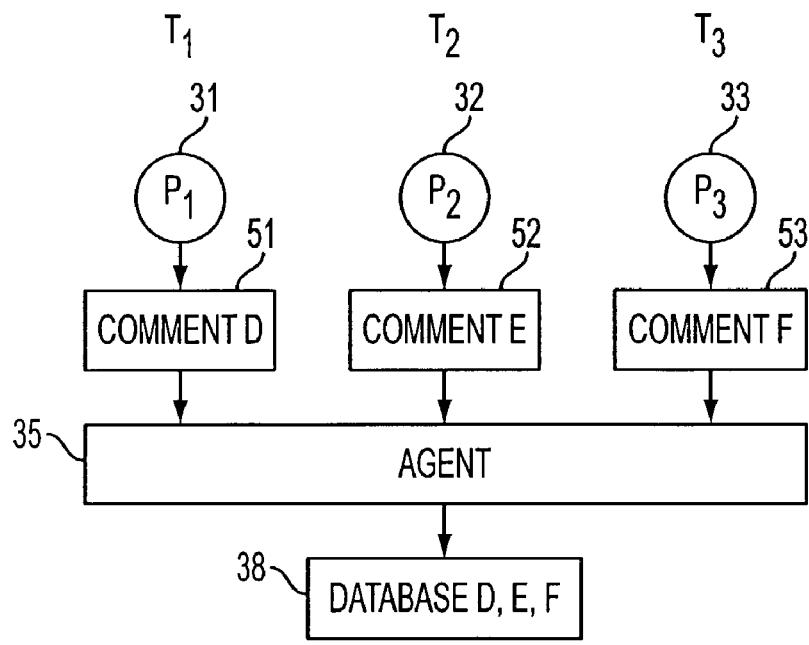
FIGS. 4-A and 4-B show flow charts for the events in a slower interaction among three individual members of a group.
Figure 4B:
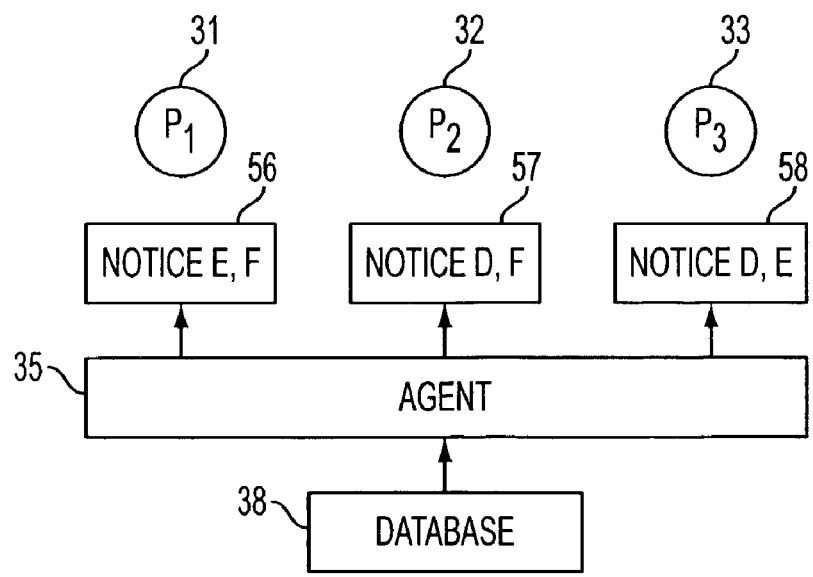

FIGS. 4-A and 4-B show flow charts for a more extended asynchronous interaction among three individual members of a group with a periodic push setting. In FIG. 4-A, at time T1, member Person 1 submits input comment D, shown as box 51. At time T2, Person 2 submits input comment E, shown as box 52. At time T3, Person 3 submits input comment F, shown as box 53. Inputs D, E, and F are each intended for the other group members. As each of the inputs is received, agent 35 selects the intended recipients, and stores the inputs in central database 37 as records D, E, and F for periodic push and notification. The push period can be any desirable period such as hourly, daily, or weekly. In some applications the push period may be minutes, seconds, or less.

In FIG. 4-B, after the elapsed predetermined period, at time T4, such as the next day if the system is set for daily notification, agent 35 pushes and posts individualized notices at the peripheral device of each member. Members do not receive notices of their own inputs. Notice 56 for Person 1 refers to inputs E and F by Persons 2 and 3. Notice 57 for Person 2 refers to inputs D and F by Persons 1 and 3. Notice 58 for Person 3 refers to inputs D and E by Persons 1 and 2. If there are eight members of the group in this example, members 4-8 receive no notification. Thus, in this approach, members 1-3 are notified that there is information, and provided with a direct link to the central database to retrieve it. Other members do not need to take any action because there is no relevant new information for them, and they know that by the absence of a notice. In addition, the members for whom there is relevant information are not burdened by a constant flow of information as with a list-server, and are shown only information relevant to them.

Figure 5:
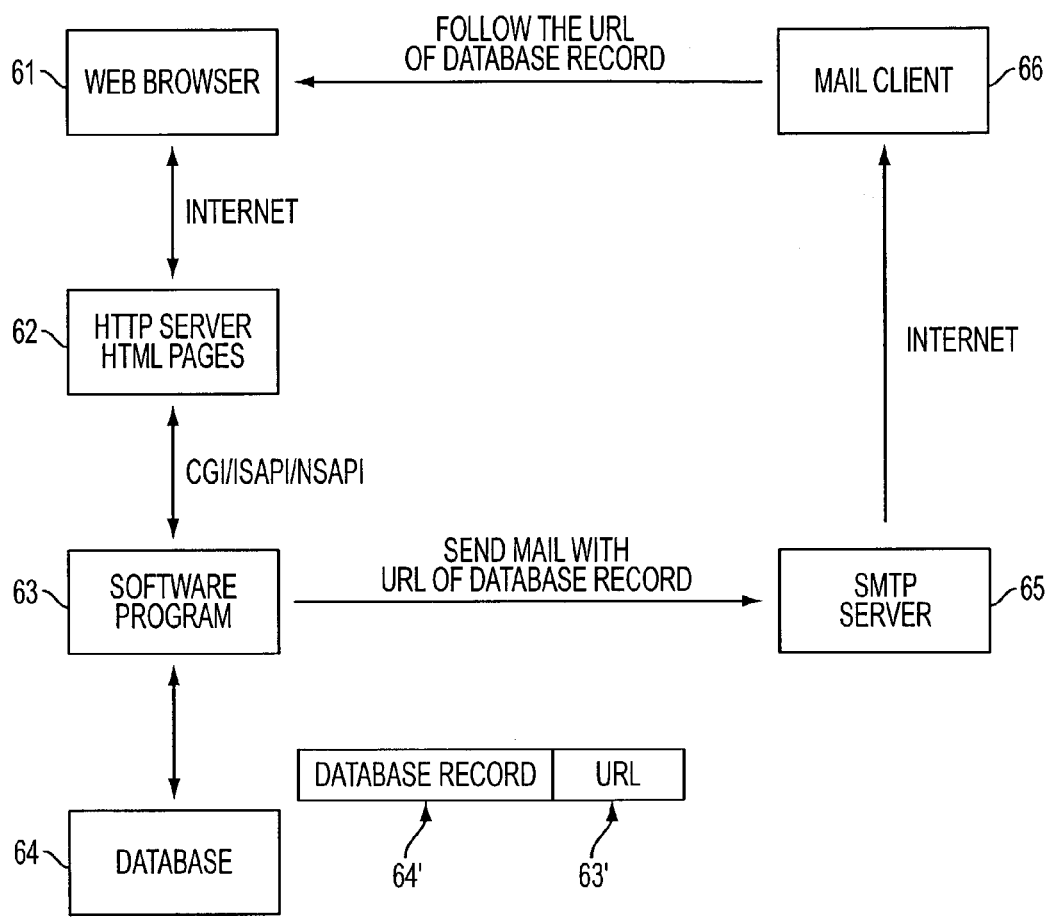
FIG. 5 is a flow chart of information flow in a system according to the invention. CGI=Common Gateway Interface; ISAPI=Internet Server Application Programming Interface (by Microsoft), and NSAPI=Netscape Server Application Programming Interface. There are other options for this software interface.

In FIG. 5, the software structure integral to the system is shown. Centrifugal access programming for intelligent agent 63 may be written according to conventional programming principles, and may be provided by a "middleware" product such as Radnet's Webshare (Cambridge, Mass.), Allaire's ColdFusion (Cambridge, Mass.), SilverStream's Web Application Platform (Irvine Calif.), or BlueStone's Sapphire/Web (Mount Laurel, N.J.). Internet-connected Web-browser(s) 61 accesses HTTP server(s) 62 and is allowed by means of centrifugal access software program 63 to access, for example, the database 64 to obtain a record of a comment 64' in a bulletin board-style Web discussion. The intelligent agent (63) retrieves the record 64' from database 64 and presents it in HTML format with URL 63' to SMTP mail server 65, and thence to mail client 66.

If the user clicks to respond to the record of the comment in database 64, and to notify the author who made the previous comment of this new response, the mail sent to notify this previous author must contain the URL 63' of the actual database record 64' of the response, as follows. Upon reading the e-mail in 66, following or clicking on the URL 63' will retrieve the new response record 64' automatically from the database 64, after clearing applicable authentication procedures such as password clearance. In a similar fashion, if software agent 63 were running overnight counting a user's number of unread messages in a bulletin board-style Web discussion from a database 64, the agent's 63 e-mail report to the user 66 must contain the URL of the actual database record of one or more of the unread messages so that following or clicking on the URL will retrieve one or more of the unread message records (1) automatically from the database (4) after clearing any authentication procedures.

In this embodiment, HTTP server 62, intelligent agent 63, database 64, and SMTP server 65 collectively establish the central agent. Intelligent agent 63 is the notice generator, and the SMTP engine 65 of a mail server is used as the notice sender if an e-mail push is used.

It is apparent from these examples that the intelligent agent is interposed between the member users and the central database, in contrast with conventional centripetal methods of collaboration. As a result the central database need not be complete. Indeed, once an input has been pushed to all intended recipients, the database could be purged, although in practice it may be preferable to keep a backup record of transactions in the group for at least a predetermined period (e.g. one month).

In a list-server, members sign up to join the group independently and can remove themselves at will. Thus, no member can control the presence of the others. The list is formed individually by the sign up of each recipient. According to a preferred embodiment of the invention, in contrast, each member can push a notice to any other person available on the internet via an e-mail message, to select an individualized and personalized group without requiring routing through a central list-server. Moreover, the central database according to the invention can be used to provide a threaded and scrollable record of relevant inputs, as opposed to the excessive number of individual e-mail messages in a list-server, which are not threaded or scrollable. The inventive system is a whole-loop database and network. Also, list servers generally do not use a database. A distinctive aspect of the invention is "pushing" the URL (or retrievable handle) of the database record or field that needs to be seen in order to present it to the user.

According to the invention, the pattern of pushing that is done may depend on the following factors:
  the list of people identified by the inputting person,
  if the people identified are not already members of the group, whether they join the group,
  whether there has been new activity relevant to a particular member,
  whether there has been a response to a particular input, a predetermined update frequency.

In a preferred commercially viable embodiment, a hypothetical group includes members 1, 2, 3 . . . n at n different locations. Each is given an e-mail notice of a group meeting, either asynchronous or scheduled at a particular time. At that time, or individually, they each re-open the e-mail message and follow a hyperlink that fires up a web browser and takes them directly to an e-meeting center, in this case a web page where they may converge. They provide a password, and join.

For an on-demand conference, members can read and post messages, read and post files, and publish and attend presentations and lectures. For a live conference, members communicate and collaborate interactively in real time via video, audio, screen sharing, chat, wireboard, and so on.

The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. A method of facilitating asynchronous group collaboration via a network, comprising:

storing, on at least one computing node accessible by at least first and second group participants via at least one network, information associated with an access channel, said stored information including at least first and second information portions;

sending notices over said at least one network to at least said first group participant and said second group participant, said notices each including at least one selectively activatable element;

receiving, from said first group participant, a message selectively activating said selectively activatable element to thereby enable access by said first group participant to said first stored information via said access channel, said computing node suppressing access by said first group participant to said stored second information portion;

receiving, from said second group participant, a message selectively activating said selectively activatable element to thereby enable access by said second group participant to said second stored information via said access channel, said computing node suppressing access by said second group participant to said stored first information portion;

whereby said access channel thereby facilitates asynchronous collaboration between said first and second group participants by supplying, to each of said first and second group participants, information relevant to said participant while suppressing access to at least some information that is not relevant to said participant.

2. The method of claim 1 wherein storing information associated with an access channel further includes storing information for subsequent use in a decision as to whether a message is relevant to a participant, including using a list of distinctions for selection of at least one group participant to receive a notice.

3. The method of claim 2 wherein storing information associated with an access channel includes storing a specification of a group participant provided by an information originator to enable said specified group participant to have access.

4. The method of claim 2 wherein storing information associated with an access channel comprises storing information associated with members who have been previously specified to receive a related notice.

5. The method of claim 2 wherein storing information associated with an access channel comprises storing information related to responses received from a previous notice.

6. The method of claim 1 wherein sending notices includes selecting a receiver based upon a selection algorithm provided to a separate software agent.

7. The method of claim 6, wherein sending notices further includes accessing the stored information by the separate software agent, the separate software agent using the stored information, at least in part, while processing the selection algorithm.

8. The method of claim 6, wherein sending notices further includes providing an activatable element in the notice that enables subsequent selective activation.

9. The method of claim 1 wherein said selectively activatable element comprises a hyperlink.

10. The method of claim 9, wherein said selectively activatable element refers the user to an intelligent agent.

11. The method of claim 1 wherein said selectively activatable element refers to a plurality of inputs that are filtered by an intelligent agent using a filtering algorithm.

12. The method of claim 1 wherein said selectively activatable element comprises a reference to an input from a disparate user.

13. The method of claim 1 wherein said selectively activatable element comprises a reference to a plurality of inputs from a plurality of disparate users.

14. The method of claim 1 wherein said selectively activatable element contained within the notice references a web page.

15. The method of claim 1 wherein sending notices includes pushing content to participants via the selectively activatable element.

16. A system for facilitating asynchronous group collaboration via a network, comprising:

a storage device that stores, on at least one computing node accessible by at least first and second group participants via at least one network, information associated with an access channel, said stored information including at least first and second information portions;

a transmitter that sends notices over said at least one network to at least said first group participant and said second group participant, said notices each including at least one selectively activatable element;

a receiver that receives, from said first group participant, a message selectively activating said selectively activatable element to thereby enable access by said first group participant to said first stored information via said access channel, said computing node suppressing access by said first group participant to said stored second information portion, and receives, from said second group participant, a message selectively activating said selectively activatable element to thereby enable access by said second group participant to said second stored information via said access channel, said computing node suppressing access by said second group participant to said stored first information portion;

said access channel thereby facilitating asynchronous collaboration between said first and second group participants by supplying, to each of said first and second group participants, information relevant to said participant while suppressing access to at least some information that is not relevant to said participant.

17. The system of claim 16 wherein the storage device stores the information associated with the access channel including a list of distinctions associated with an access channel for subsequent use in a decision as to whether a message is relevant to a participant, including selection of group participant to receive a notice.

18. The system of claim 16 wherein the storage device stores the information associated with the access channel including a specification of a group participant provided by an information originator to enable said specified group participant to have access.

19. The system of claim 16 wherein the transmitter enables a group participant who has previously been specified as a member of a group specified to receive related notices.

20. The system of claim 16 wherein the transmitter is configured to select a receiver based upon a selection algorithm provided to a separate software agent.

21. The system of claim 16 wherein said selectively activatable element comprises a hyperlink.

22. The system of claim 16 further including an intelligent agent, wherein said selectively activatable element refers to a plurality of inputs that are filtered by the intelligent agent using a filtered algorithm.

23. The system of claim 16 wherein said selectively activatable element comprises a reference to an input from a disparate user.

24. The system of claim 16 wherein said selectively activatable element comprises a reference to a plurality of inputs from a plurality of disparate users.

25. The system of claim 16 wherein said selectively activatable element contained with the notice references a web page.

* * * * *